United States Patent [19]

Toyohara et al.

[11] Patent Number: 4,745,954
[45] Date of Patent: May 24, 1988

[54] TREAD PATTERN

[75] Inventors: Kiyoshi Toyohara, Hiratsuka; Kojiro Ishikawa, Yokohama; Tadanobu Nagumo, Hiratsuka, all of Japan

[73] Assignee: The Yokohoma Rubber Co., Ltd., Tokyo, Japan

[21] Appl. No.: 895,105

[22] Filed: Aug. 11, 1986

[30] Foreign Application Priority Data

Aug. 15, 1985 [JP] Japan .................. 60-178577

[51] Int. Cl.$^4$ ............................. B60C 11/06
[52] U.S. Cl. ................................ 152/209 R
[58] Field of Search ................ 152/209 R, 209 D

[56] References Cited

PUBLICATIONS

Doi et al., Effect of Tire Tread Pattern on Groove Wander of Motorcycles, Tire Science and Technology, vol. 13, No. 3, Jul.-Sep. 1985, pp. 147-153 (presented in Akron on Mar. 28-29, 1984).

Primary Examiner—Michael Ball
Attorney, Agent, or Firm—Armstrong, Nikaido, Marmelstein & Kubovcik

[57] ABSTRACT

A tread pattern in which the width and positions of grooves formed annularly in the portion of the surface of the tread which corresponds to the ground-contacting surface of the tire, in such a manner that the grooves extend in the circumferential direction of the tire, are suitably limited.

1 Claim, 4 Drawing Sheets

TREAD PATTERN

BACKGROUND

This invention relates to a tread pattern on a pneumatic tire for passenger cars, which displays an excellent stability when the car runs on a road surface having grooves which extend in the direction in which the car runs.

There are some expressways and general roads which are provided in the surfaces thereof with longitudinal grooves extending substantially in parallel with one another in the direction in which a car runs and in a regularly-spaced manner (for example, at intervals of 19 mm), so as to prevent the travelling stability of a car from being spoiled when the road surface is moistened.

A conventional tire for passenger cars, which has in its ground-contacting surface linear grooves extending in the circumferential direction of the tire, has in general an excellent travelling stability on a moistened road surface as compared with other types of tires. However, in such a tire for passenger cars, which has linear grooves mentioned above, a tottering phenomenon called groove wandering occurs while the car runs on such a road surface, so that the linear travelling stability of the car is liable to be spoiled.

Accordingly, in order to improve the travelling stability of the tire, the tread pattern formed on the ground-contacting surface of the tire is designed so that the edges of the tread pattern and the longitudinal grooves in the road surface are not aligned with each other (not less than two edges of the tread pattern do not simultaneously engage the grooves in the road surface), and the rigidity of the edges of the tread pattern is set to a low level. Nevertheless, the groove wandering cannot sufficiently be suppressed.

SUMMARY

The present inventors ascertained that the lateral force varies even in a position other than the position in which the edges of a tread pattern and those of the longitudinal grooves in a road surface collide with (engage) each other, and achieved this invention by determining the position and width of the grooves in the tread pattern on the basis of this knowledge with the pitch and width of the grooves in the road surface taken into consideration.

It is an object of the present invention to provide a tread pattern for pneumatic tires, which has an excellent wet skid preventing performance, and which is capable of minimizing the occurrence of groove wandering to retain the linear travelling stability of the car and prevent the driver from feeling uncomfortable.

In order to achieve this object, the present invention provides a tread pattern for pneumatic tires, which is suitably used for a tire on a wheel of a car running on a road surface having longitudinal grooves having a pitch a and a groove width b and extending in the car-travelling direction, and which has in its ground-contacting surface at least one linear groove extending in the circumferential direction of the tire, the tread pattern being characterized in that a plurality of linear grooves of a width larger than the width b of each groove in the road surface are provided in the ground-contacting surface of the tire so as to extend annularly in the circumferential direction of the tire, the positions of these linear grooves in the ground-contacting surface being restricted by Ai and Bj which satisfy the following equations.

$$am + (b+2) \leq Ai \leq a(m+1) - (b+2)$$

and $$an - b \leq Bj \leq an + b$$

In this equation, Ai is a distance larger than zero [defined in FIGS. 1(A)–1(G)] between rib edges on the same side; Bj a distance larger than zero [defined in FIGS. 1(A)–1(G)] between rib edges on the different sides; m and n are each zero or one of natural numbers; i is 1, 2, 3, ...; and j is 1, 2, 3, ...

The above and other objects as well as features of the invention will become clear from the following description of the preferred embodiments.

THE DRAWINGS

FIGS. 1(A)–1(G) illustrate how to restrict the distances Ai and Bj in the tread pattern according to the present invention;

FIG. 2 illustrates an example of a road surface having longitudinal grooves extending in the direction in which a car runs;

FIGS. 3(A) and 3(B) illustrate ground-contacting surfaces of tires, respectively representing an example of tread patterns according to the present invention;

FIGS. 4(A) and 4(B) illustrate ground-contacting surfaces of tires, respectively representing an example of conventional tread patterns of this kind;

FIGS. 5(A) and 5(B) illustrate ground-contacting surfaces of tires, respectively representing another example of conventional tread patterns of this kind; and FIG. 6 is a graph showing the relation between the results of evaluation of comfortableness of a ride on a car and the distances Ai and Bj.

THE PREFERRED EMBODIMENTS

Among FIGS. 1(A)–1(G), FIG. 1(A) shows a symmetric tread pattern having two grooves 3 in the surface of a tread 1, i.e. the ground-contacting surface 2 of a tire, the grooves 3 extending annularly in the circumferential direction of the tire. FIG. 1(B) shows a symmetric tread pattern having three grooves, FIG. 1(C) a symmetric tread pattern having four grooves, FIG. 1(D) another symmetric tread pattern having four grooves, FIG. 1(E) still another symmetric tread pattern having four grooves, FIG. 1(F) a symmetric tread pattern having five grooves, and FIG. 1(G) another symmetric tread pattern having five grooves.

According to the present invention, Ai and Bj shown in these drawings satisfy the following equations. When Ai is not satisfied, the amplitude of lateral force increases to cause the deterioration of the linear travelling stability of the car. When Bj is not satisfied, the amplitude of lateral force does not decrease, so that the linear travelling stability of the car is not improved. Further, as is apparent from the drawings, the position at which each of the distances Ai and Bj is taken differs depending on the number of grooves in the tire tread, so that for example, the position at which Ai and Bj are respectively taken in the case of a two-groove tire as shown in FIG. 1(A) and the position at which Ai and Bj are respectively taken in the case of a three-groove tire as shown in FIG. 1(B) do not correspond to each other (even if it of course is that the two Ai's above are of an identical number i and the two Bj's above are of an identical number j). That is to say, there lies no correspondence between the positions at which Ai and Bj are to be taken and the positions of grooves in the tire.

$$am+(b+2) \leq Ai \leq a(m+1)-(b+2)$$

and $$an-b \leq Bj \leq an+b$$

FIG. 2 shows an example of a road surface having longitudinal grooves extending in the direction in which a car runs.

Referring to FIG. 2, a road surface 4 is provided with longitudinal grooves 5. Reference letter a denotes a distance between adjacent grooves, b the width of a groove.

FIGS. 3(A) and 3(B) show embodiments of tread patterns according to the present invention of pneumatic tires of 205/60 R15 size, in which the distance a between adjacent grooves and the width b of a groove, which are shown in FIG. 2, are set to 19 mm and 3 mm, respectively. Referring to FIGS. 3(A) and 3(B), reference letter 1 denotes the circumferential center lines of the tires, and reference number 3 grooves.

FIG. 3(A) shows a symmetric tread pattern having three grooves, in which Ai and Bj shown in FIG. 1(B) are 32 mm and 38 mm, respectively. These values are within the limited range of measurements of a tread pattern according to the present invention of $19m+5 \leq Ai \leq 19m+14$ and $19n-3 \leq Bj \leq 19n+3$. $A_1=32$ mm (suitable), and $B_1=38$ mm (suitable). m and n are each zero or one of natural numbers. Therefore, when m is substituted by one to make calculations, the following results are obtained.

$$19 \times 1+5 \leq Ai \leq 19 \times 1+14$$

$$24 \leq Ai \leq 33$$

This is within the limited range of values according to the present invention.

When n is substituted by 2 to make calculations, the following results are obtained.

$$19 \times 2-3 \leq Bj \leq 19 \times 2+3$$

$$35 \leq Bj \leq 41$$

This is also within the limited range of values according to the present invention.

FIG. 3(B) shows a symmetric tread pattern having four grooves, which corresponds to the tread pattern of FIG. 1(D) among the tread patterns of FIGS. 1C, 1D and 1E. Referring to FIG. 3(B), $A_1=43$ mm, $A_2=27$ mm, $A_3=70$ mm, $B_1=20$ mm, $B_2=34$ mm, $B_3=120$ mm, $B_4=77$ mm and $B_5=50$ mm, and among these, $A_1$, $A_2$, $A_3$, $B_1$, and $B_4$ are within the limited ranges of measurements of the tread pattern according to the present invention of $19m+5 \leq Ai \leq 19m+14$ and $19n-3 \leq Bj \leq 19n+3$. The tread patterns of $A_1$, $A_2$, $A_3$, $B_1$ and $B_4$ which are within the limited ranges of values according to the present invention correspond to the tread pattern of FIG. 1(D). Namely, $A_1=43$ mm (suitable), $A_2=27$ mm (suitable), $A_3=70$ mm (suitable), $B_1=20$ mm suitable), $B_2=34$ mm (unsuitable), $B_3=120$ mm (unsuitable), $B_4=77$ mm (suitable) and $B_5=50$ mm (unsuitable).

FIGS. 4(A) and 4(B) show examples of conventional tread patterns on pneumatic tires of 205/60 R15 size, in which the same number of grooves as in the tread patterns of FIGS. 3(A) and 3(B) are provided in the same manner.

FIG. 4(A) shows a symmetric tread pattern having three grooves, in which the distances Ai and Bj shown in FIG. 1(B) are 35 mm and 46 mm, respectively. These values are not within the limited ranges of measurements of the tread pattern according to the present invention of $19m+5 \leq Ai \leq 19m+14$ and $19n-3 \leq Bj \leq 19n+3$. Namely, $A_1=35$ mm (unsuitable), and $B_1=46$ mm (unsuitable).

FIG. 4(B) shows an example of a conventional symmetric tread pattern having four grooves. Referring to FIG. 4(B), $A_1=40$ mm, $A_2 22$ mm, $A_3=62$ mm, $B_1=13$ mm, $B_2=31$ mm, $B_3=111$ mm, $B_4=71$ mm and $B_5=49$ mm. Among these, $B_3$ alone is within the limited ranges of measurements of the tread pattern according to the present invention of $19m+5 \leq Ai \leq 19m+4$ and $19n-3 \leq Bj \leq 19n+3$, and $B_1$, $B_2$, $B_4$ and $B_5$ are not. Namely, $A_1=40$ mm (unsuitable), $A_2=22$ mm (unsuitable), $A_3=62$ mm (unsuitable), $B_1=13$ mm (unsuitable), $B_2=31$ mm (unsuitable), $B_3=111$ mm (suitable), $B_4=71$ mm (unsuitable) and $B_5=49$ mm (unsuitable).

Figure 1:
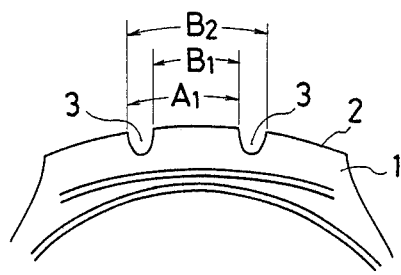
Figure 1:
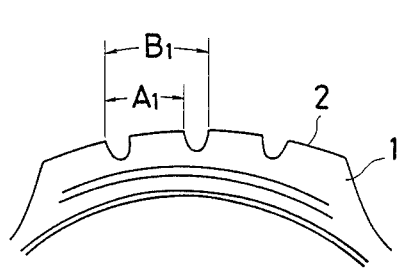
Figure 1:
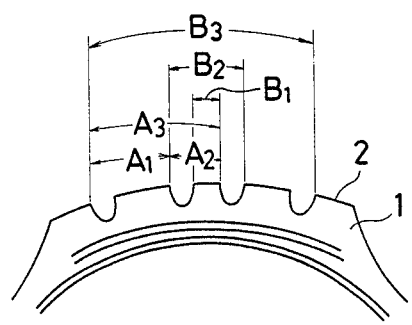
Figure 1:
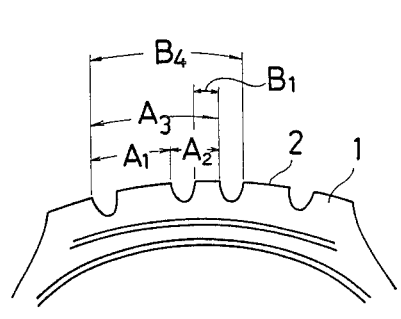
Figure 1:
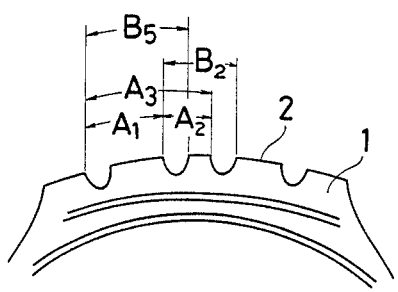
Figure 1:
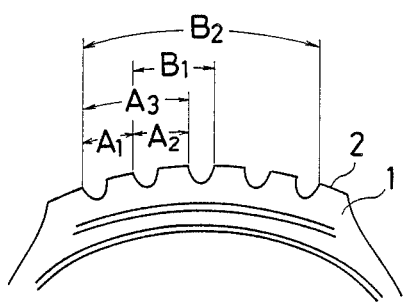
Figure 1:
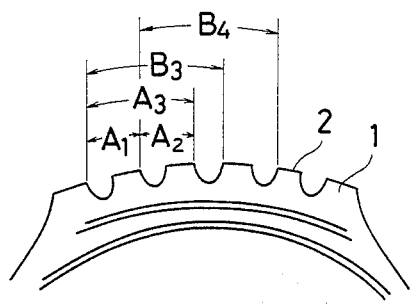
Figure 2:
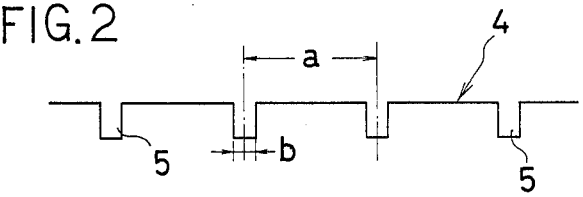
Figure 3:
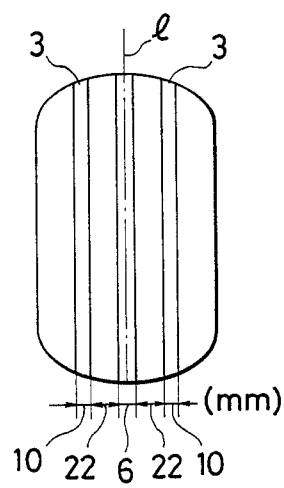
Figure 3:
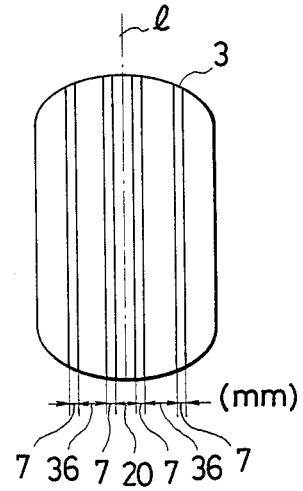
Figure 4:
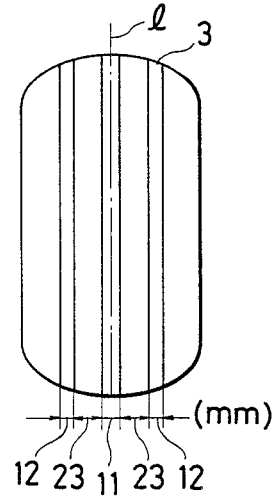
Figure 4:
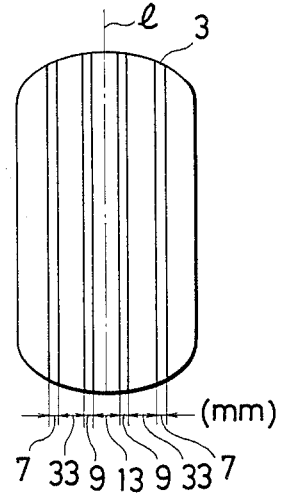
Figure 5:
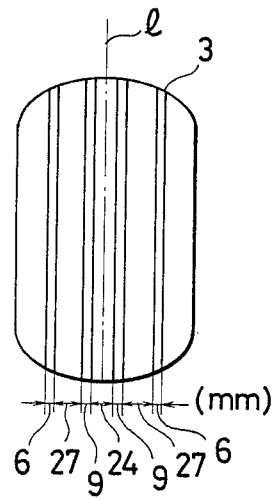
FIG. 5(A) shows an example of a conventional symmetric tread pattern having four grooves, which has suitable Ai measurements and unsuitable Bj measurements. Namely, $A_1=33$ mm (suitable), $A_2=33$ mm (suitable), $A_3=66$ mm (suitable), $B_1=24$ mm (unsuitable), $B_2=42$ mm (unsuitable), $B_3=108$ mm (unsuitable), $B_4=75$ mm (suitable) and $B_5=42$ mm (unsuitable).
FIG. 5(B) shows an example of a conventional symmetric tread pattern having four grooves, which has unsuitable Ai measurements and suitable Bj measurements. Namely, $A_1=41$ mm (unsuitable), $A_2=27$ mm (suitable), $A_3=68$ mm (unsuitable), $B_1=19$ mm (suitable), $B_2=35$ mm (suitable), $B_3=17$ mm (suitable), $B_4=76$ mm (suitable) and $B_5=49$ mm (unsuitable).
Figure 5:
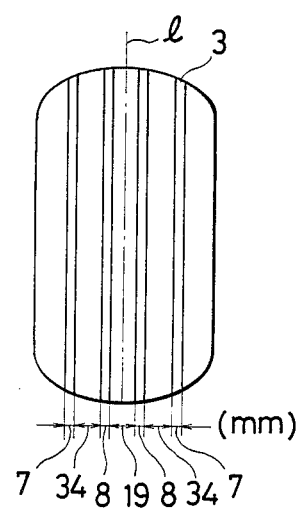
Figure 6:
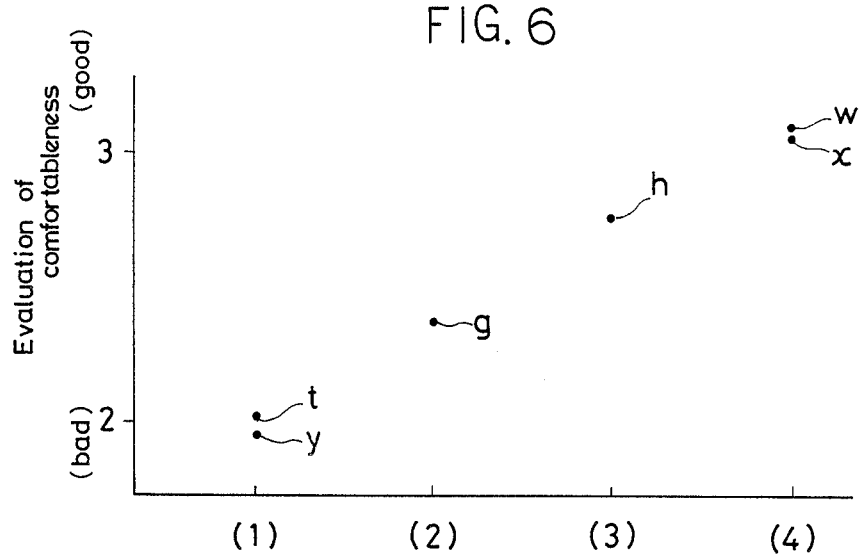

The rating of the comfortableness of a ride on an actual car with respect to the groove wandering was done by using tires (4 types of tires including a tire having suitable Ai measurements, a tire having unsuitable Ai measurements, a tire having suitable Bj measurements and a tire having unsuitable Bj measurements) having various groove positions and groove widths. The results are shown in FIG. 6. FIG. 6 is a graph showing the relation between the results of the rating of the comfortableness of a ride on a car having various tires and the limited measurements of Ai and Bj. Referring to FIG. 6, reference letter w denotes the tread pattern of FIG. 3(A), x the tread pattern of FIG. 3(B), y the tread pattern of FIG. 4(A), t the tread pattern of FIG. 4(B), g the tread pattern of FIG. 5(A) and h the tread pattern of FIG. 5(B). Along the lateral axis of FIG. 6, (1) indicates a tread pattern having unsuitable measurements of Ai and Bj, (2) a tread pattern having suitable measurements of Ai and unsuitable measurements of Bj, (3) a tread pattern having unsuitable measurements of Ai and suitable measurements of Bj and (4) a tread pattern having suitable measurements of Ai and Bj.

The above-mentioned rating was done according to a five-point rating method. A larger point shall indicate a higher grade, and the points of not less than 3 allowable levels.

| Point | Running condition of the car |
|---|---|
| 5 | The occupant does not feel the shaking of the car body at all. |
| 4 | The occupant feels the shaking of the car body at times if he gives careful attention to the movement of the car. It is not clearly determined whether this phenomenon occurs due to disturbance or the shaking of a tire. |
| 3 | The occupant feels the car body shake to a small extent at times but he is not annoyed with the shaking of the car body. |
| 2 | The occupant continuously feels the car body shake when the car runs in normal condition. |
| 1 | The occupant's body as a whole is shaked when the car runs in normal condition, and the shaking of the car body can be visually recognized. |

FIG. 6 shows that the tires in which the measurements of both Ai and Bj shown in FIGS. 1(A) to 1(G) are within the limited ranges of $am+(b+2) \leq Ai \leq a(m+1)-(b+2)$ and $an-b \leq Bj \leq an+b$ have excellent effects. Therefore, it is understood that the tread pattern according to the present invention serves much more than a conventional tread pattern to improve the degree of comfortableness of a ride on a car and maintain the high linear travelling stability thereof. The tread pattern according to the present invention may be not such a symmetric tread pattern as mentioned above but an asymmetric tread pattern.

According to the present invention described above, the positions of the linear grooves are limited so that the distances Ai and Bj satisfy the equations $am+(b+2) \leq Ai \leq a(m+1)-(b+2)$ and $an-b \leq Bj \leq an+b$, and the width of the grooves are also suitably limited. This enables the provision of a tire having an improved groove wandering preventing performance without causing the wet skidding preventing performance thereof to be deteriorated as compared with that of a tire having a conventional tread pattern.

We claim:

1. A tread pattern for pneumatic tires, which is suitably used for a tire in a wheel of a vehicle running on a road surface having longitudinal grooves in said rod surface having a pitch a and a groove width b and extending in the cartravelling direction, and which said pattern has in its ground-contacting surface at least two linear grooves extending in the circumferential direction of said tire, said tread pattern being characterized in that said linear grooves are of a width larger than the width b of each groove in said road surface, the positions of said linear grooves in said ground-contacting surface of said tire being restricted by Ai and Bj which satisfy the equations, $$am+(b+2) \leq Ai \leq a(m+1)-(b+2)$$

and $$an-b \leq Bj \leq an+b$$

wherein Ai is the distance between rib edges of linear grooves on the same side of said tire surface and larger than zero; Bj is the distance between rib edges of linear grooves on the different sides of said tire surface and larger than zero; m and n are each zero or one of the natural numbers i is 1, 2, 3, . . .; and j is 1, 2, 3, . . .

* * * * *